United States Patent [19]

Rose

[11] Patent Number: 5,107,211

[45] Date of Patent: Apr. 21, 1992

[54] TRANSDUCER FOR MEASURING ROTARY DISPLACEMENT OF AN OBJECT

[76] Inventor: Mitchell Rose, 3718 Silsby Rd., University Hts., Ohio 44118

[21] Appl. No.: 507,759

[22] Filed: Apr. 12, 1990

[51] Int. Cl.[5] .............................................. G01B 7/30
[52] U.S. Cl. ............................ 324/207.16; 324/207.25
[58] Field of Search .................... 324/207.15, 207.16, 324/207.14, 207.22, 207.25, 207.24, 233; 336/84 R, 84 M, 84 C, 233, 234, 45, 136; 331/65, 67

[56] References Cited

U.S. PATENT DOCUMENTS

| | | | |
|---|---|---|---|
| 3,502,966 | 3/1970 | Perets et al. | 324/207.15 |
| 3,513,408 | 5/1970 | McGee | 324/207.16 X |
| 3,756,081 | 9/1973 | Young | 324/207.16 X |
| 3,900,814 | 8/1975 | Masuda | 324/207.21 X |
| 3,961,243 | 6/1976 | Schulz | 336/136 X |
| 3,991,393 | 11/1976 | Becker, Jr. | 336/84 X |
| 4,203,085 | 5/1980 | Elsässer et al. | 336/234 X |
| 4,502,006 | 2/1985 | Goodwin et al. | 324/233 X |
| 4,536,714 | 8/1985 | Clark | 336/84 R X |
| 4,627,280 | 12/1986 | Hayashi et al. | 324/207.16 X |
| 4,649,341 | 3/1987 | Ulbrich et al. | 324/207.16 |
| 4,652,819 | 3/1987 | Kammerer | 324/236 X |
| 4,667,158 | 5/1987 | Redlich | 324/207.19 |
| 4,950,985 | 8/1990 | Voss et al. | 324/207.16 |

Primary Examiner—Kenneth A. Wieder
Assistant Examiner—Warren S. Edmonds
Attorney, Agent, or Firm—Calfee, Halter & Griswold

[57] ABSTRACT

An inductive transducer for measuring rotary displacement is provided in which the transducer uses a probe capable of being displaced within a hollow interior portion of a partially toroidal coil. The partially toroidal coil, which is typically uniformally wound, is connected in parallel with a stable-frequency current-based oscillator which transmits an AC voltage oscillating signal relating to the inductance of the coil. A demodulating circuit, which is capable of converting the AC voltage oscillating signal to a DC voltage level, is connected in parallel with the oscillator. In one preferred embodiment, the probe is inserted into the hollow interior portion of the partially toroidal coil by way of a pivoting arrangement. In operation, the probe is displaced within the hollow interior portion of the coil such that a change in inductance of the coil results. A corresponding change in the AC voltage amplitude of the oscuillating signal is communicated to the demodulating circuit which generates a change in DC voltage level relating to the change in the oscillating signal.

2 Claims, 2 Drawing Sheets

TRANSDUCER FOR MEASURING ROTARY DISPLACEMENT OF AN OBJECT

BACKGROUND OF THE INVENTION

The invention relates to electrical apparatuses for converting the relative motion of an object into an electrical signal and more particularly to an improved inductive transducer for measuring rotary displacement.

In the field, it is often necessary to convert a position of an object relative to an origin into an electrical signal. This output signal, which can be analog or digital is often then fed into other electrical devices. In process monitoring systems, for example, the signal can be inputted into an electrical indicator which outputs a display of the required data. Such data may include liquid pressure, linear position, tension, or any other like measurement. In process control systems, for example, the electrical signal can be used as feedback and inputted into the controller which acts, based on the nature of the signal, to control the position of the object relative to an origin.

Applications exist for inductive based measurements of linear displacement of a probe. In a device such as that disclosed by U.S. Pat. No. 4,667,158 to Redlich, the linear displacement of a metallic cylindrical core within a helical coil of wire causes corresponding changes in the amplitude of the voltage signal imposed across the coil. This voltage signal is then demodulated by a half-wave rectifier including a diode, a resistor and a low-pass filter. A reference signal is demodulated by a second identical half-wave rectifier. The demodulated reference signal and the demodulated coil voltage signal are fed into the inverting and non-inverting inputs of a differential amplifier having an output which drives an electrical indicating instrument.

In a similar device, such as that shown in U.S. Pat. No. 3,513,408 to McGee, the movement of a tapered magnetic core with respect to a fixed coil of wire causes changes in the inductance of the coil. These changes in inductance determine the frequency of an oscillator, and the frequency output of the oscillator is converted by a demodulator circuit into a digital signal or an analog output voltage. In order to maintain linearity, the McGee transducer depends on the use of the tapered core.

Additionally, applications exist for inductive-based measurements of an object subjected to rotary displacement. For example, there are measurements requiring knowledge regarding the magnitude of displacement to which a shaft is subjected. In one common arrangement, a potentiometer is employed to determine angular displacement of the shaft. A disadvantage inherent with this arrangement is that components of the potentiometer, such as brushes, are continually subjected to wear and tear, and thus eventually fail.

SUMMARY OF THE INVENTION

According to the present invention, an inductive displacement transducer is a provided which uses probe capable of being disposed within a partially toroidal coil having a hollow interior portion in which the probe can be displaced. The partially toroidal coil is connected electrically in parallel with a stable frequency current-based oscillating circuit which transmits an AC voltage oscillating signal responsive to the inductance of the partially toroidal coil. Additionally, a demodulating circuit, which is capable of converting the AC voltage oscillating signal to a DC voltage level, is connected in parallel with the oscillating circuit.

In one preferred embodiment, the probe is curved along its central axis and the radius of curvature of the coil is similar to that of the curved longitudinal axis of the coil so that the probe can be readily inserted and withdrawn from the coil. Additionally, an arrangement is provided for automatically inserting the probe into the hollow interior portion of the partially toroidal coil. In particular, the arrangement includes a shaft having first and second ends which are respectively connected to a mounting member and a probe. The probe is preferrably aligned along an axis that is substantially co-extensive with the curved longitudinal axis of the partially toroidal coil so that upon rotation of the shaft through a predetermined arc, the above-mentioned automatic insertion is achieved.

During operation, rotary displacement of the probe within the coil results in changes in the inductance of the partially toroidal coil. A change in inductance results in a corresponding change in the AC voltage amplitude of the signal output of the oscillating circuit, which in turn is communicated to the demodulating circuit. A DC voltage level corresponding to the linear or non-linear change in the voltage amplitude of the signal output of the oscillating circuit is outputted by the demodulating circuit.

In one aspect of the invention, the probe can include various probe types which are used to enhance the sensitivity and/or the flexibility of the transducer. For example, various probe shapes, and more particularly probe surfaces, can be employed to alter either the linearity or non-linearity of the transducer response. Additionally, a curved, tapered probe, a substantial portion of which can be extended through the coil, may be used to maximize the range over which measurements are achieved.

Numerous advantages of the present invention will be appreciated by those skilled in the art.

One advantage of the invention is that it presents a particularly economical way to achieve accurate measurements of rotary displacement. In particular, a transducer which maximizes sensitivity while minimizing production costs is provided. For example, due to the design of the transducer, its components are subjected to very little wear during operation. Hence, the transducer is durable and has a long life. Additionally, sensitivity can be enhanced by many orders of magnitude when a probe constructed from a plurality of wires is used.

Another advantage of the transducer is that it promotes simplicity of design on both structural and procedural levels while maintaining highly desirable levels of measurement capability. It is particularly significant that the transducer eliminates many of the inefficiencies and/or difficulties encountered when making inductive based measurements requiring non-linear response. According to the present invention, measurements of non-linear response are easily made by the transducer without any need to alter the transducer circuitry. More specifically, non-linear measurements are effectively achieved by simply reconfiguring an edge of the probe member.

Yet another advantage of the invention is that the probe can be inserted into the hollow interior portion of the partially toroidal coil in response to the pivoting of a shaft about an axis. Use of a pivoting arrangement advantageously allows for convenient and precise insertion of the probe.

These and other features, advantages and objects of the present invention will be further understood and appreciated by those skilled in the art by reference to the following written specification, claims and appended drawings.

DETAILED DESCRIPTION OF THE PREFERRED EMBODIMENT

It is to be understood that the invention described below may assume various alternative orientations and step sequences except where expressly specified to the contrary. It is also to be understood that the specific devices and processes illustrated in the attached drawings, and described in the following specification, are simply exemplary embodiments of the inventive concepts defined in the appended claims. Hence, specific dimensions, and other physical characteristics related to the embodiments disclosed herein are not to be considered as limiting, unless the claims by their language expressly state otherwise.

Figure 1:
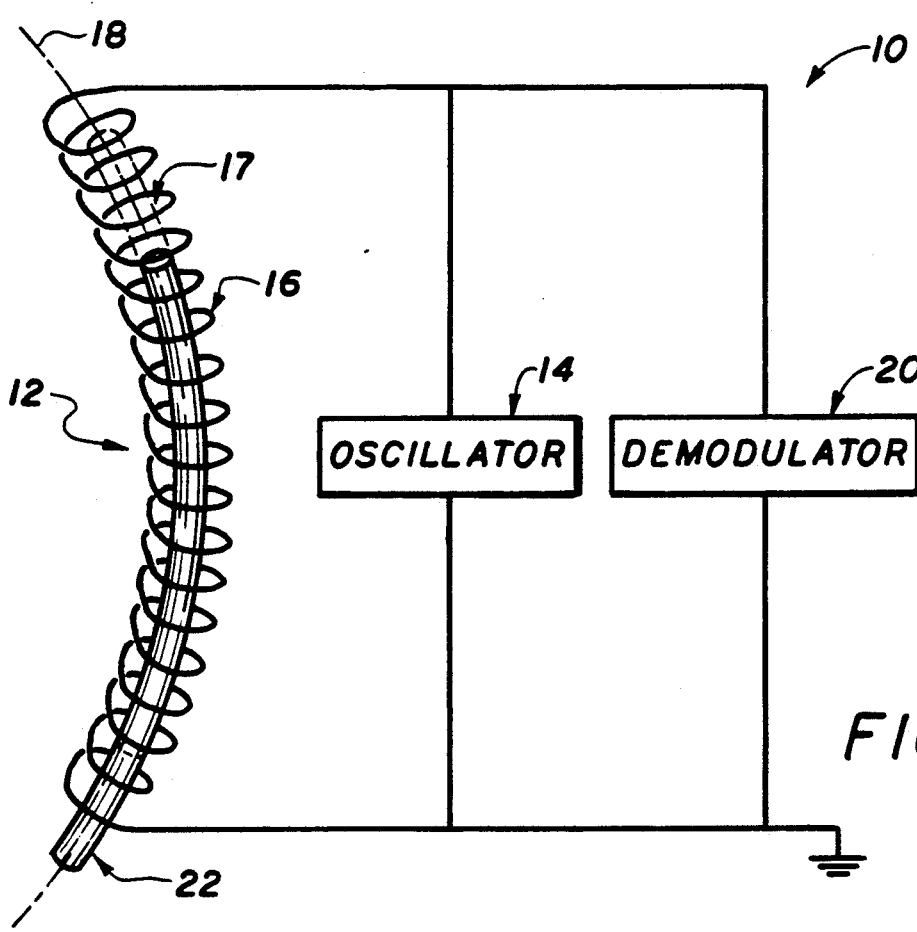
FIG. 1 is a partially diagramatic, partially perspective view of an inductive displacement transducer embodying the present invention.

Referring to FIG. 1, the inductive displacement transducer embodying the present invention is designated by the numeral 10. The transducer 10 includes a coil arrangement 12 and an oscillating circuit 14. In one example, the coil arrangement includes a coil 16 having a hollow interior portion 17, which coil 16 is wound in the shape of a partial toroid. That is, the coil 16, as best illustrated in FIG. 1, is wrapped in the form of a semi-circle, i.e. a partial toroid. Additionally, the coil 16 is disposed along a curved longitudinal axis 18, and in order to generate a magnetic field, the coil is made of a conductive material through which current can readily be transmitted. Finally, the coil 16 may, in one example, have a length ranging from 1 in.-25 in. and a diameter ranging from 0.1 in.-0.5 in.

The oscillating circuit 14, which is disposed electrically in parallel with the coil arrangement 12, includes conventional componentry and is designed to produce a sine wave having a frequency and a current amplitude, both of which are constant. A demodulating circuit 20, which is also constructed of known componentry is disposed electrically in parallel with the oscillator circuit 14. It has been found that desirable demodulation can be achieved by using the demodulator circuit of U.S. Pat. No. 4,667,158 to Redlich, which is incorporated by reference herein. The demodulating circuit 20 is designed to output a DC voltage that is linearly related to the voltage amplitude of the sine wave output of the oscillating circuit 14.

Figure 2:
FIGS. 2-7 illustrate perspective views of probes used to expand capability of the transducer.
Figure 3:
Figure 4:

As explained in further detail below, operation of transducer 10 depends on the use of a probe which may assume various shapes. Referring to FIGS. 2-4, probes 22, 24 and 26, which assume various cross-sectional shapes, are illustrated. In one example, each of probes 22, 24 and 26 has a uniform cross-sectional area throughout its curved longitudinal axis 28, and as illustrated by FIGS. 2-4, the cross-sectional shapes of probes 22, 24 and 26, as viewed along their transverse cross-sections are round, square and triangular, respectively.

Figure 5:
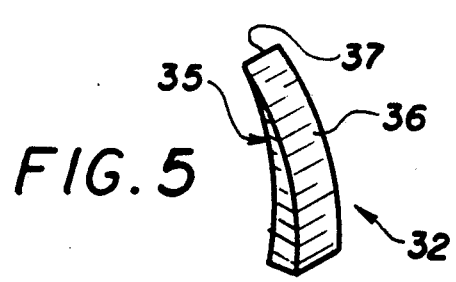
Figure 6:
Figure 7:
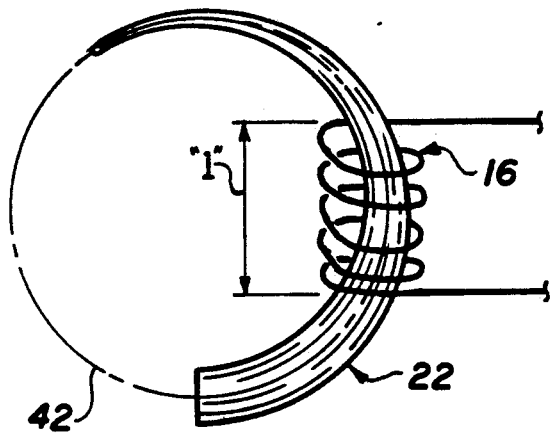

Referring to FIGS. 5-6, probes 32 and 34, having various edge straight surface configurations, are illustrated. It can be observed that probe 32 has surfaces 35, 36 that converge at straight edge 37 while probe 34 has an undulating edge 38. Referring to FIG. 7, a tapered probe 40 is illustrated. The probe 40 has a circular cross-section with a diameter that varies along its curved longitudinal axis 42. In the preferred embodiment, at least a portion of probe 40 is capable of being extended through the entire length of the interior portion of coil 16.

In the preferred embodiment, each of the above described probes 22, 24, 26, 32 and 34 is made of ferromagnetic material. Alternatively, either of probes 22, 24, 26, 32 and 34 may be made of a non-ferromagnetic material, such as aluminum. Experimentation has indicated, however, that optimum measurements are achieved through use of a probe made of ferromagnetic material.

Additionally, while in the preferred embodiment, the probes 22, 24, 26, 32 and 34 are curved about their lengths, curved probes are not required to achieve the purpose of the invention. Finally, in one preferred embodiment each of the probes 22, 24, 26, 32 and 34 can have a radius of curvature that is about the same as the coil's curved longitudinal axis 18.

Figure 8:
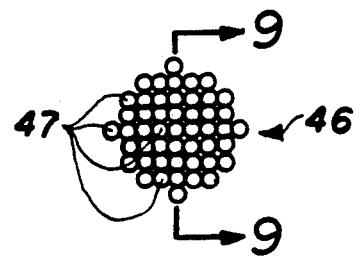
FIG. 8 is an end view of a probe constructed from a plurality of wires.
Figure 9:
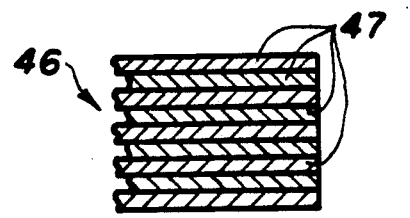
FIG. 9 is a partial, longitudinal cross-sectional view of the probe of FIG. 8 taken along the plane 9—9.

Referring to FIGS. 8-9, a probe, which is capable of enhancing sensitivity of transducer 10, is designated by the numeral 46. In the preferred embodiment, probe 46 can assume the shape and dimensions of any of the probes typically employed, such as probe 22. The difference between probe 46 and any of the probes discussed above is that probe 46 is constructed from a plurality of wires 47 which are conventionally bound together. Through experimentation it has been found that steel cable having 49 strands, typically found in hardware stores, can be employed to achieve desirable measurements. To construct a probe 46 having a specific shape, applicant has found that it is desirable, but not necessary, to construct the probe 46 with wires of corresponding specific shapes. For example: to construct a cylindrically-shaped probe 46, such as probe 22, it is appropriate to use wires having a round cross-section; to construct a rectangularly shaped probe, such as probe 24, it may be desirable to use wires having a rectangular cross-section; and so on.

Figure 10:
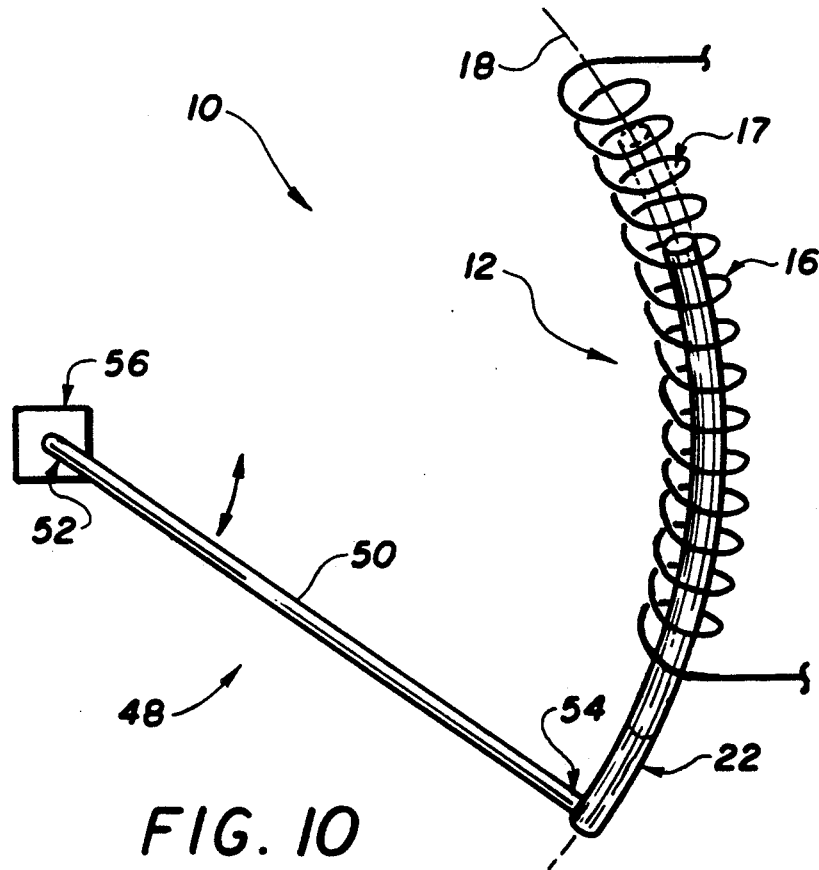
FIG. 10 illustrates a partial perspective view of FIG. 1 with a pivoting arrangement, which pivoting arrangement is used to insert one of the probes into a hollow portion of a partially toroidal coil.

Referring to FIG. 10, a pivoting assembly 48 adapted to automatically insert one of probes 22, 24, 26, 32, 34, 40 or 46 is shown. For ease of discussion, the probe 22 is shown in use with assembly 48, but it will be understood that pivoting assembly 48 can be used with any of the above-described probes. Pivoting assembly 48 includes a shaft 50 having a first end 52 and a second end 54. The shaft first end 52 is rotatably mounted to a mounting member 56. Since mounting member 56 is conventional, it is represented by a blank box. The shaft second end 54 is connected to the probe 22. As can be recognized, mounting member 56 is spaced radially of the coil 16, and is positioned so that when shaft 50 is rotated, the probe 22 travels along a path coextensive with the axis 18.

In one preferred form of operation, in which rotary displacement of a probe is to be measured, the above-described sine wave is produced using the oscillating circuit 14 (FIG. 1), and probe 22 is inserted, either manually or by employment of pivoting assembly 48, into the hollow interior portion 17 of coil 16. As the axial position of probe 22 is altered, the load on oscillating circuit 14 is correspondingly altered. To maintain constant current amplitude, the oscillating circuit 14 adjusts its voltage amplitude. Since the AC amplitude of the output of the oscillating circuit 14 is linearly related to the inductance of coil 16, and the DC voltage output of the demodulating circuit 20 is linearly related to the AC voltage amplitude of the output of the oscillating circuit 14, the output of the demodulating circuit 20 responds linearly with the positional adjustment of probe 22 along the curved longitudinal axis 18 of coil 16.

It should be noted that while probe 22 was employed to achieve the above-described linear response, use of either of probes 22, 24 and 26 would result in the type of linear response described above. Additionally, when a ferromagnetic probe is employed, the voltage output of the demodulating circuit 20 is positive, while, conversely, when a non-ferromagnetic probe is employed, such as an aluminum probe, the voltage output of the demodulating circuit 20 is negative.

Various capabilities and advantages associated with some of the structural features discussed above can now be further appreciated. Referring to FIGS. 2-4, probes 22, 24 and 26 are constructed to provide for linear response from the transducer. On the other hand, referring to FIGS. 5-6, the probes 32 and 34 are configured to afford non-linear response from the transducer 10. More specifically, probe 32 is adapted to provide a logarithmic relationship between the output of transducer 10 and probe position, while probe 34 allows for a sinusoidal relationship between the output of transducer 10 and probe position.

Referring to FIG. 7, it will again be noted that at least a portion of tapered probe 40 can be inserted completely through the interior, hollow portion of coil 16. As should be understood, in many commonly employed configurations of inductive displacement transducers, one end of the probe must always be outside of the coil and the other end must always be within the coil. In these embodiments, the measurable displacement is limited by the length of the coil. With the tapered probe 40 of FIG. 7, the transducer 10 can measure displacement that is much larger than the coil 16 since the extent to which the probe 40 can be inserted through coil 16 is not limited, as with the configurations mentioned immediately above. Indeed the only limiting factor when using tapered probe 40 is the extent to which the circumference of the probe varies from the top of the probe 40 to the bottom of the probe 40. It should be appreciated that use of probe 40 allows for measurement of relatively large rotary displacements, particularly when the length (designated as "l" in FIG. 7) of coil 16 is small relative to probe 40. For example, when the probe 40 is a ring, measurement of rotary displacement can approach 360° if the length of coil 16 is relatively small, and if the probe 40 can be completely inserted through the hollow portion 17 of coil 16.

Referring again to the probe 46 of FIGS. 8-9, it should be appreciated that the sensitivity of measurement is dramatically increased as the amount of wires 47 employed to construct a given probe 46 is increased. More specifically, the sensitivity of the transducer 10 will be increased when it is used in conjunction with a probe 46 composed of more than two metal wires 47. It has been found that when the probe 46 is constructed from a number, n, of wires 47, each of which is substantially uniform, the sensitivity gain of transducer 10, i.e. S, will vary as a function of the square root of n according to the following equation:

$$S = \sqrt{n}$$

where:
S = gain in sensitivity for a probe constructed from a plurality of wires.
n = number of wires used to construct the probe.

To more fully understand the above relationship, consider the following example: a curved cylindrically shaped probe, such as probe 22, having a given total circumference is constructed of 49 wires. In that case, the sensivity of the transducer 10, when used with the probe 46, will be seven times greater than if a solid probe of the same total circumference had been used (i.e. $\sqrt{49} = 7$). It should be appreciated that the above relationship holds true for other probes having transverse cross-sectional shapes which differ from that of probe 22. Additionally, the above relationship is applicable, possibly to a lesser degree, even when non-uniform wires, such as dissimilar or tapered wires, are used to construct the probe 46.

A simple, yet effective, arrangement has been described for measuring rotary displacement of a probe. The arrangement is particularly durable since its components are subjected to little wear and tear. In the preferred embodiment, the probes are configured to allow for a wide variety of measurements when the probes are used with the transducer. The probes can be inserted into a hollow interior portion of the coil in response to the pivoting of a shaft about an axis. By constructing the probes with a plurality of wires, sensitivity of the measurements can be substantially enhanced.

In the foregoing description, it will be readily appreciated by those skilled in the art that modifications may be made to the invention without departing from the concept disclosed herein. Such modifications are to be considered as included in the following claims unless those claims, by their language, expressly state otherwise.

The embodiments of the invention in which an exclusive property or privilege is claimed are defined as follows:

1. A transducer for measuring rotary displacement of an object, comprising:
   a uniformly wound partially toroidal coil for generating a magnetic field when an electrical current passes therethrough, said coil having a predetermined length and an inductance determined in part by said length, said coil defining a hollow interior portion and having a curved longitudinal axis;
   a curved steel probe for changing the inductance of said partially toroidal coil in response to the insertion of said probe within said hollow interior portion of said coil along said curved longitudinal axis, said steel probe having a radius of curvature substantially the same as that of said curved longitudinal axis of said coil, said steel probe further having at least one surface coextensive with said predetermined length of said coil which is substantially undulatory in shape;

an oscillating circuit connected electrically in parallel to said partially toroidal coil, said oscillating circuit being responsive to said change in the inductance of said coil to output an oscillating signal having a voltage amplitude varying as a function of the change in the inductance;

a demodulating circuit connected electrically in parallel to said oscillating circuit, said demodulating circuit being responsive to changes in said oscillating signal of said oscillating circuit to output a sinusoidal voltage signal relating to the axial position of said curved steel probe within said hollow interior portion of said partially toroidal coil; and means for inserting said curved steel probe within said hollow interior portion of said partially toroidal coil.

2. The inductive transducer of claim 1, wherein said means for inserting includes:

a mounting member being spaced radially of said partially toroidal coil; and a shaft having a first end and a second end, said first end being rotatably mounted to said mounting member, and said second end being connected to said probe, whereupon rotation of said shaft through a predetermined arc inserts a portion of said probe into said hollow portion of said partially toroidal coil.

* * * * *